United States Patent
Burch

[15] 3,693,676
[45] Sept. 26, 1972

[54] UNDERWATER PILE CUTTING SAW
[72] Inventor: Edward N. Burch, 6261 Swartout Road, Algonac, Mich. 48001
[22] Filed: Dec. 16, 1970
[21] Appl. No.: 98,663

[52] U.S. Cl. ................................143/32 R, 143/34
[51] Int. Cl. ............................................B27b 17/08
[58] Field of Search .......................143/32 R, 34, 43

[56] References Cited

UNITED STATES PATENTS

| | | | |
|---|---|---|---|
| 3,545,506 | 12/1970 | Hopper | 143/34 X |
| 3,581,832 | 6/1971 | Heermann | 143/43 B X |
| 3,533,456 | 10/1970 | Hovhannesian | 143/32 R |
| 1,221,401 | 4/1917 | Wilhelm et al. | 143/34 |

*Primary Examiner*—Donald R. Schran
*Attorney*—John N. Randolph

[57] ABSTRACT

A power saw capable of being manually manipulated above the surface of a body of water for cutting off pilings and the like adjacent the bottom. A locator member which engages around the piling or object to be cut includes a post about which the saw swings, across the locator member, for cutting off the piling or object.

5 Claims, 9 Drawing Figures

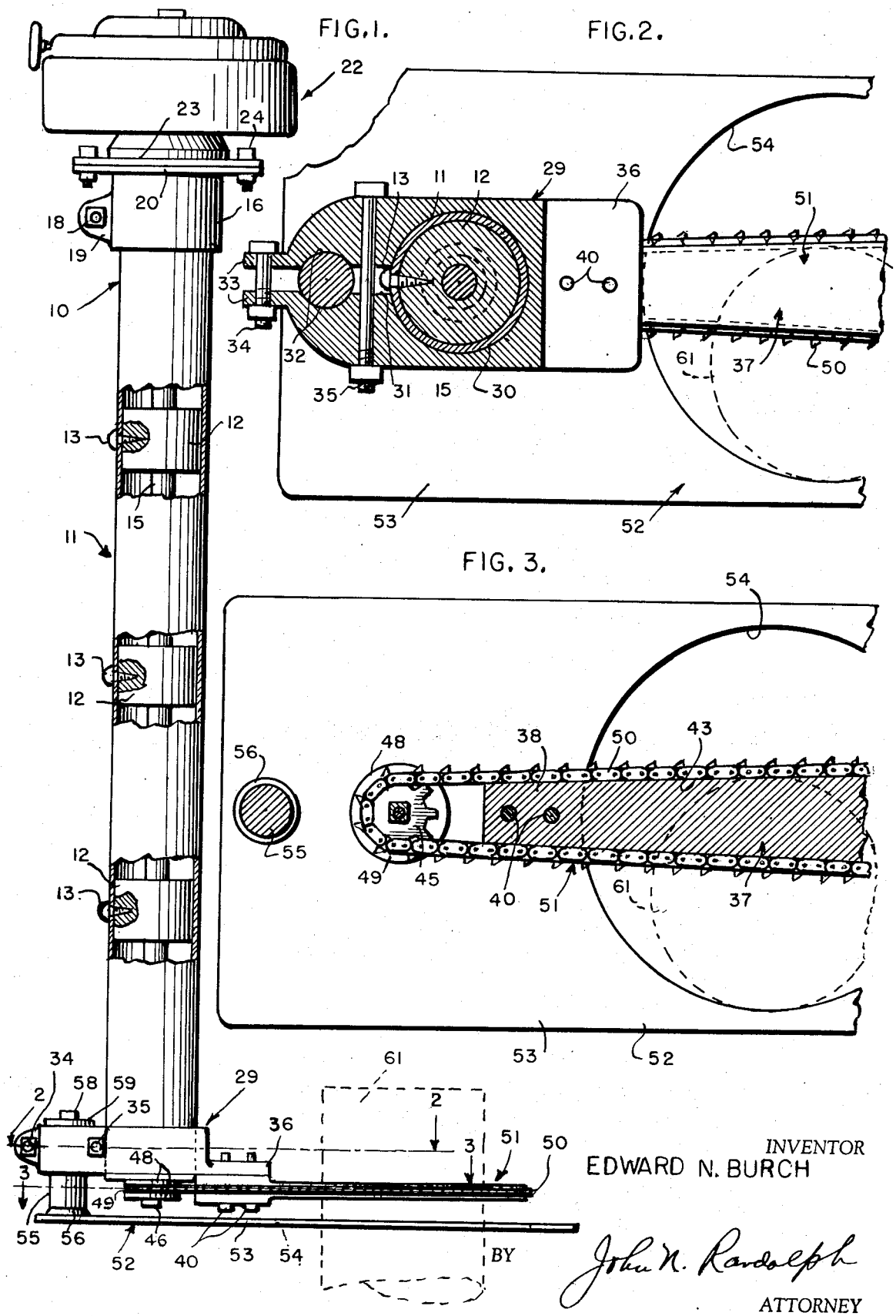

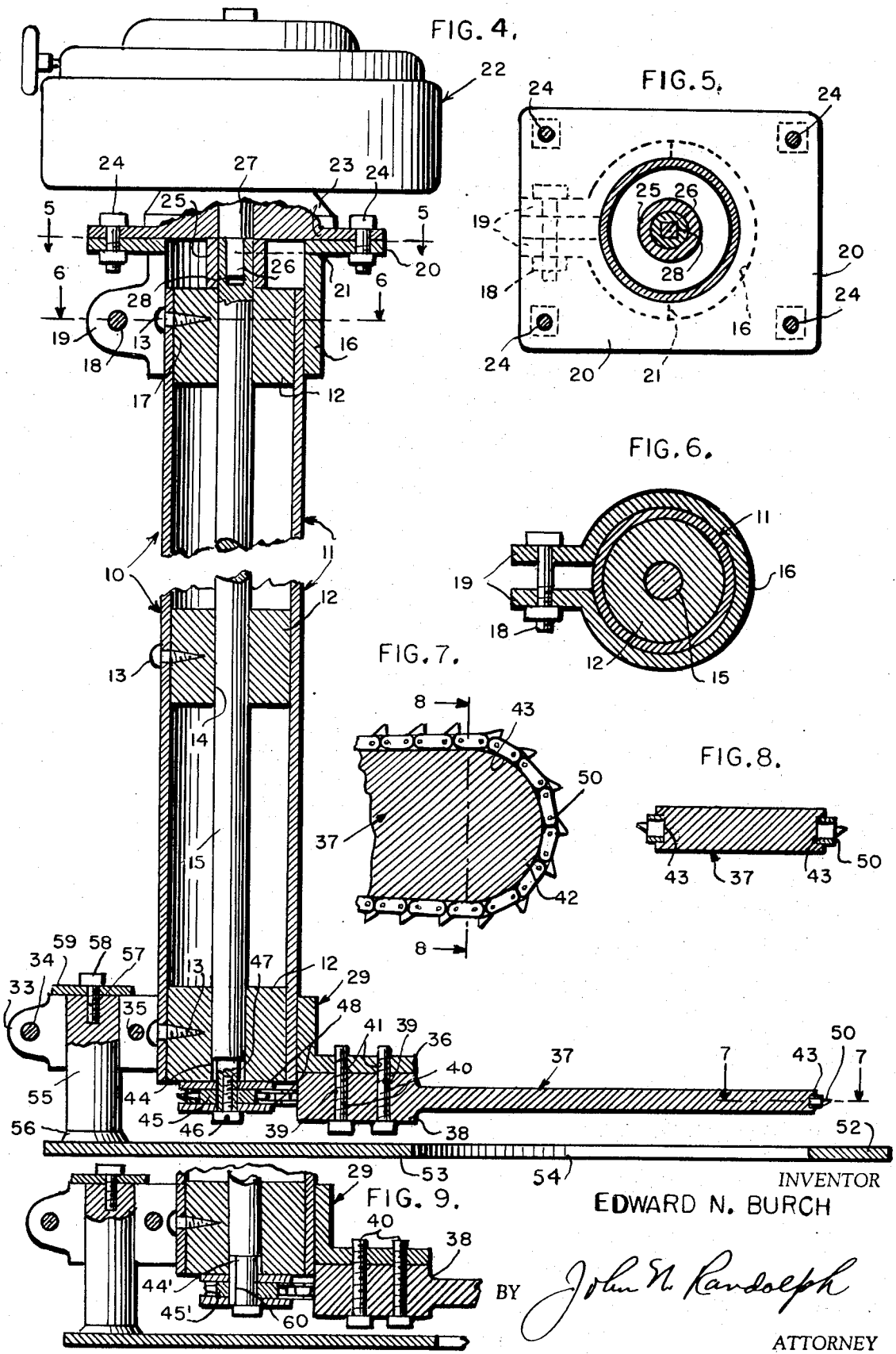

UNDERWATER PILE CUTTING SAW

SUMMARY

It is a primary object of the present invention to provide a power saw which can be manipulated from a boat, barge, dock or the like for cutting off pilings or other objects adjacent the bottom of a body of water, from which such objects project, to eliminate such objects as navigational hazards.

Another object of the invention is to provide a power saw including a locator member capable of encircling the piling or object to be cut and which can rest upon the bottom of the body of water, and a chain saw which is swingable connected to said locator member for movement thereacross for cutting off the piling or object, adjacent the bottom.

A further object of the invention is to provide a pile cutting saw of extremely simple construction capable of being very economically manufactured, and which can be readily manipulated by one operator from above the surface of a body of water.

Still another object of the invention is to provide a saw adapted to utilize a conventional small gasoline engine and a substantially conventional chain saw, as parts of the power unit thereof.

Various other objects and advantages of the invention will hereinafter become more fully apparent from the following description of the drawings, illustrating a presently preferred embodiment thereof, and wherein:

BRIEF DESCRIPTION OF THE DRAWINGS

FIG. 1 is a side elevational view, partly broken away, of the pile cutting saw;

FIG. 2 is an enlarged fragmentary horizontal sectional view, taken substantially along a plane as indicated by the line 2—2 of FIG. 1;

FIG. 3 is a similar view taken substantially along a plane as indicated by the line 3—3 of FIG. 1;

FIG. 4 is an enlarged fragmentary substantially central vertical sectional view, partly in elevation, of the pile cutting saw;

FIGS. 5 and 6 are cross sectional views, taken substantially along planes as indicated by the lines 5—5 and 6—6, respectively, of FIG. 4;

FIG. 7 is an enlarged fragmentary horizontal sectional view, taken substantially along a plane as indicated by the line 7—7 of FIG. 4;

FIG. 8 is a cross sectional view taken substantially along a plane as indicated by the line 8—8 of FIG. 7, and FIG. 9 is a fragmentary view similar to a portion of FIG. 4 and illustrating a slight modification.

DESCRIPTION OF THE PREFERRED EMBODIMENTS

Referring more specifically to the drawings, and first with reference to FIGS. 1 to 8, the pile cutting saw in its entirety and as illustrated therein is designated generally 10, and includes an elongated rigid tubular housing or casing 11 containing a plurality of longitudinally spaced bearings 12 which are secured to the casing 11 by fastenings 13. The bearings 12 are preferably formed of nylon and have aligned central bores 14 for receiving a shaft 15 which extends to beyond the ends of the casing 11.

A split clamping collar 16 is secured around the upper end 17 of the casing 11 by a nut and bolt fastening 18, which extends through the spaced apart apertured ears 19 of said collar. A flange 20 is mounted on the upper edge of the collar 16 and is secured by welding 21 to the half of the collar disposed opposite the ears 19, so that the collar portions located adjacent to the ears 19 can be drawn together by the fastening 18 for clamping the collar on the casing 11.

A conventional small gasoline engine 22 has a base 23 which rests on the flange 20 and which is secured thereto by nut and bolt fastenings 24 which extend through the corners of the flange 20 and base 23. The base 23 has a centrally disposed depending annular boss 25 which surrounds and is spaced from the terminal 26 of the driveshaft 27 of the engine 22, which extends downwardly from said engine. The upper end of the shaft 15 fits into the boss 25 and has an upwardly opening socket 28 in which the shaft end 26 is non-rotatively received. The parts 26 and 28 may be square or of other non-circular shape in cross section to conformably interfit.

An elongated bracket 29 is provided with a large opening 30 intermediate of its ends, as best seen in FIG. 2, for receiving the lower end of the casing 11. A relatively wide slot 31 extends from a part of the opening 30 through one end of the bracket 29 and is provided with opposed inwardly facing recesses 32 which are spaced from the opening 30. The outer end of the slot 31 is defined by ears 33 constituting said bracket end and which are connected by a nut and bolt fastening 34 which extends through aligned apertures thereof. A nut and bolt fastening 35 extends transversely through the bracket 29, across the slot 31, between the opening 30 and recesses 32. A flat plate 36 constitutes the other end of the bracket 29 and extends from the bottom part of the intermediate portion of said bracket in which the opening 30 is formed.

An elongated chain bar 37 has an inner end 38 which is disposed against the underside of the plate 36. Said end 38 has bores 39 to slidably receive headed bolts 40 which extend upwardly therethrough and threadedly engage in openings 41 of the plate 36, for securing the chain bar 37 to the bracket 29, so that it forms an extension of the bracket end 36. The chain bar 37 increases in width from its inner end 38 to its rounded or semi-circular outer end 42 and is provided with a groove 43 which extends along its side edges and around said outer end.

The shaft 15 has a restricted lower end 44 of square or non-circular cross section which projects from the lowermost bearing 12 and the lower end of the casing 11 and which extends below the underside of the bracket 29. A sprocket wheel 45 fits non-rotatively on the shaft end 44 and is secured thereon by a headed bolt 46 which engages a downwardly opening threaded socket 47 of the shaft end 44. Washers 48 are disposed on the shaft end 44, above and below the sprocket wheel 45, and are of diameters as large as the diameter of the sprocket wheel to provide an annular groove 49, as seen in FIG. 3, for a part of an endless cutting chain 50 which is trained around the sprocket wheel 45. The chain 50 passes around the groove 43, as seen in FIGS. 2, 3, 4 and 7, and combines with said sprocket wheel 45 and the bar 37 to form the chain saw 51.

A locator member 52 comprises an elongated plate 53 having a large opening 54 in one end thereof. A post 55 is secured, as by welding, as indicated at 56, to the other end of the plate 53 and extends upwardly therefrom. The post 55 engages in the opening formed by the recesses 32 and a part of the slot 31, as seen in FIGS. 2 and 4. The fastening 35 is tightened for clamping the lower end of the casing 11 in the opening 30 of the bracket 29. However, the fastening 34 is only slightly tightened so that the bracket 29 may turn on the post 55. Said post has an upwardly opening threaded socket 57 for receiving the threaded shank of a headed bolt 58 which extends downwardly through a disc 59 which is of a diameter larger than the post 55 and which rests upon a portion of the upper surface of the bracket 29 for turnably connecting said bracket to the post.

FIG. 9 differs from FIG. 4 only in that the shaft end 44' and a sprocket wheel 45' are substituted for the shaft end 44 and a sprocket wheel 45, respectively. The shaft end 44' and the sprocket wheel 45' are non-rotatively connected to one another by a spline connection 60.

Assuming that the pile cutting saw is assembled as illustrated in the drawings, the lower part thereof including the chain saw 51 and locator member 52 are lowered into the water. The casing 11, bracket 29 and chain saw 51 are swung about the post 55 to position the chain saw 51 to one side of the opening 54 so that said opening can be passed over a piling 61 or other submerged object extending upwardly from the bottom of a body of water, not shown, when such piling or object is located by the plate 53 coming in contact therewith. The pile cutter 10 is then lowered until the plate 53 is resting on the bottom, after which the casing 11, bracket 29 and saw 51 are swung clockwise, as seen in FIG. 3, to bring the chain saw into engagement with the piling or object 61. Assuming that the engine 22 is operating so that the sprocket wheel 45 or or 45' and the chain 51 are being driven from the engine 22 through the shaft 15, the chain 50 will revolve in a clockwise direction, as seen in FIG. 3, for cutting through the piling or object 61 as the bracket 29 and the chain saw 51 are swung clockwise about the post 55 until the piling or object 61 is cut off at a level only slightly above the plate 53.

Various modifications and changes are contemplated and may be resorted to, without departing from the function or scope of the invention.

I claim as my invention:

1. An underwater pile cutting saw comprising an elongated tubular casing having an upper end and a lower end, a shaft extending longitudinally through and rotatively mounted in said casing, a power source having a driveshaft, means mounting said power source on said upper end of the casing, means coupling the driveshaft to the upper end of said first mentioned shaft, a chain saw, a bracket supported by the lower end of said casing and supporting said chain saw, said chain saw including a sprocket wheel coupled to the lower end of said first mentioned shaft for rotation therewith, locator means, and means pivotally connecting the locator means to the bracket for swinging movement of the locator means beneath the chain saw for locating pilings and other objects to be cut by the saw and for swinging movement of the bracket, casing and saw relative to the locator means for cutting through a piling or other object engaged by the locator means.

2. An underwater pile cutting saw as in claim 1, said locator means having an opening spaced from the means pivotally connecting the locator means to the bracket and in which a piling or other object is confined while being cut by the saw.

3. An underwater pile cutting saw as in claim 1, said locator means comprising an elongated plate having an opening spaced from the means pivotally connecting the locator means to the bracket for receiving a piling or other object to be cut.

4. An underwater pile cutting saw as in claim 1, said first mentioned means comprising a collar detachably clamped around the upper end of said casing and having a top flange disposed normal to the axis of the casing, said power source having a base resting on said flange, and fastenings detachably securing the base to the flange.

5. An underwater pile cutting saw as in claim 1, said power source comprising a conventional small gasoline engine.

* * * * *